United States Patent
Oren

(10) Patent No.: US 9,446,801 B1
(45) Date of Patent: Sep. 20, 2016

(54) TRAILER ASSEMBLY FOR TRANSPORT OF CONTAINERS OF PROPPANT MATERIAL

(71) Applicant: Oren Technologies, LLC, Houston, TX (US)

(72) Inventor: Joshua Oren, Houston, TX (US)

(73) Assignee: OREN TECHNOLOGIES, LLC, Houston, TX (US)

(*) Notice: Subject to any disclaimer, the term of this patent is extended or adjusted under 35 U.S.C. 154(b) by 0 days.

(21) Appl. No.: 13/854,405

(22) Filed: Apr. 1, 2013

(51) Int. Cl.
*B62D 53/06* (2006.01)
*B62D 33/02* (2006.01)
*B60D 1/48* (2006.01)

(52) U.S. Cl.
CPC ............... *B62D 33/02* (2013.01); *B60D 1/488* (2013.01); *B62D 53/06* (2013.01); *B62D 53/061* (2013.01); *B62D 53/065* (2013.01)

(58) Field of Classification Search
CPC .. B62D 53/065; B62D 53/061; B62D 53/06; B60D 1/488
USPC ................. 280/423.1, 425.2, 425.1; 414/481
See application file for complete search history.

(56) References Cited

U.S. PATENT DOCUMENTS

| | | | |
|---|---|---|---|
| 137,871 | A | 4/1873 | Worsley |
| 150,894 | A | 5/1874 | Safely |
| 384,443 | A | 6/1888 | Hoover |
| 448,238 | A | 3/1891 | Johnson |
| 711,632 | A | 10/1902 | Johnson |
| 917,649 | A | 4/1909 | Otto |
| 1,143,641 | A | 6/1915 | McGregor |
| 1,331,883 | A | 2/1920 | Stuart |
| 1,344,768 | A | 6/1920 | Messiter |
| 1,434,488 | A | 11/1922 | Forsythe et al. |
| 1,520,560 | A | 12/1923 | Burno |
| 1,506,936 | A | 9/1924 | Lea |
| 1,526,527 | A | 2/1925 | Butler |
| 1,573,664 | A | 2/1926 | Wetherill |
| 1,850,000 | A | 3/1932 | Fernand |

(Continued)

FOREIGN PATENT DOCUMENTS

| | | |
|---|---|---|
| CA | 2023138 | 2/1992 |
| CA | 2791088 | 3/2013 |

(Continued)

OTHER PUBLICATIONS

International Preliminary Report on Patentability for PCT/US2013/032819, Sep. 23, 2016, (6 pages).

(Continued)

*Primary Examiner* — Kevin Hurley
*Assistant Examiner* — Marlon A Arce
(74) *Attorney, Agent, or Firm* — Hogan Lovells US LLP

(57) ABSTRACT

A trailer assembly suitable for carrying a container of proppant has a frame with a first side rail and a second side rail extending in generally parallel relation to each other and a plurality of wheels rotatably mounted below the frame. The frame has a plurality of cross members extending between the side rails. First and second outriggers extend across the side rails so as to each have one end extending outwardly of one of the side rails and an opposite end extending outwardly of the other side rail. The first and second outriggers are suitable for receiving the container of proppant thereon. The frame has a first section positioned above the wheels and a second section positioned at a level lower than a level of the first section. The proppant container is placed on the first section.

16 Claims, 3 Drawing Sheets

(56) References Cited

U.S. PATENT DOCUMENTS

| | | |
|---|---|---|
| 1,973,312 A | 9/1934 | Hardinge |
| 2,233,005 A | 2/1941 | Garlinghouse |
| 2,293,160 A | 8/1942 | Miller et al. |
| 2,368,672 A | 2/1945 | McNamara |
| 2,423,879 A | 7/1947 | De Frees |
| 2,564,020 A | 8/1951 | Mengel |
| 2,616,758 A | 11/1952 | Meyers |
| 2,622,771 A | 12/1952 | Tulou |
| 2,652,174 A | 9/1953 | Shea et al. |
| 2,792,262 A | 4/1955 | Hathom |
| 2,865,521 A | 12/1958 | Fisher et al. |
| 2,894,666 A | 7/1959 | Campbell, Jr. |
| 3,049,248 A | 8/1962 | Heltzel et al. |
| 3,064,832 A | 11/1962 | Heltzel |
| 3,083,879 A | 4/1963 | Coleman |
| 3,090,527 A | 5/1963 | Rensch |
| 3,163,127 A | 12/1964 | Gutridge et al. |
| 3,199,585 A | 8/1965 | Cronberger |
| 3,248,026 A | 4/1966 | Kemp |
| 3,270,921 A | 9/1966 | Nadolske et al. |
| 3,281,006 A | 10/1966 | Wei |
| 3,294,306 A | 12/1966 | Areddy |
| 3,318,473 A | 5/1967 | Jones et al. |
| 3,353,599 A | 11/1967 | Swift |
| 3,354,918 A | 11/1967 | Coleman |
| 3,378,152 A | 4/1968 | Warner |
| 3,387,570 A | 6/1968 | Pulcrano et al. |
| 3,397,654 A | 8/1968 | Snyder |
| 3,407,971 A | 10/1968 | Oehler |
| 3,455,474 A | 7/1969 | Truncali |
| 3,528,570 A | 9/1970 | Pase |
| 3,561,633 A | 2/1971 | Morrison et al. |
| 3,587,834 A | 6/1971 | Dugge |
| 3,601,244 A | 8/1971 | Ort et al. |
| 3,602,400 A | 8/1971 | Cooke |
| 3,653,521 A | 4/1972 | Bridge |
| 3,661,293 A | 5/1972 | Gerhard et al. |
| 3,721,199 A | 3/1973 | Hassenauer |
| 3,729,121 A | 4/1973 | Cannon |
| 3,738,511 A | 6/1973 | Lemon et al. |
| 3,785,534 A | 1/1974 | Smith |
| 3,800,712 A | 4/1974 | Krug, Jr. |
| 3,817,261 A | 6/1974 | Rogge |
| 3,820,762 A | 6/1974 | Bostrom et al. |
| 3,861,716 A * | 1/1975 | Baxter .................. B62D 53/065 280/423.1 |
| RE29,006 E * | 10/1976 | Coleman ........................ 40/588 |
| 3,986,708 A | 10/1976 | Heltzel et al. |
| 4,004,700 A | 1/1977 | Empey |
| 4,063,656 A | 12/1977 | Lambert |
| 4,138,163 A | 2/1979 | Calvert et al. |
| 4,178,117 A | 12/1979 | Brugler |
| 4,204,773 A | 5/1980 | Bates |
| 4,210,273 A | 7/1980 | Hegele |
| 4,210,963 A | 7/1980 | Ricciardi et al. |
| RE30,358 E | 8/1980 | Sensibar |
| 4,222,498 A | 9/1980 | Brock |
| 4,232,884 A * | 11/1980 | DeWitt .................. B62D 21/20 280/785 |
| 4,239,424 A | 12/1980 | Pavolka |
| 4,247,228 A | 1/1981 | Gray et al. |
| 4,265,266 A | 5/1981 | Kierbow et al. |
| 4,282,988 A | 8/1981 | Hulbert, Jr. |
| 4,350,241 A | 9/1982 | Wenzel |
| 4,359,176 A | 11/1982 | Johnson |
| 4,363,396 A | 12/1982 | Wolf et al. |
| 4,397,406 A | 8/1983 | Croley |
| 4,398,653 A | 8/1983 | Daloisio |
| 4,402,392 A | 9/1983 | Fabian et al. |
| 4,407,202 A | 10/1983 | McCormick |
| 4,408,886 A | 10/1983 | Sampson et al. |
| 4,428,504 A | 1/1984 | Bassett et al. |
| 4,449,861 A | 5/1984 | Saito et al. |
| 4,474,204 A | 10/1984 | West |
| 4,478,155 A | 10/1984 | Cena et al. |
| 4,532,098 A | 7/1985 | Campbell |
| 4,608,931 A | 9/1986 | Ruhmann et al. |
| 4,626,155 A | 12/1986 | Hlinsky et al. |
| 4,701,095 A | 10/1987 | Berryman et al. |
| 4,715,754 A * | 12/1987 | Scully ........................... 410/107 |
| 4,738,774 A | 4/1988 | Patrick |
| 4,741,273 A | 5/1988 | Sherwood |
| 4,801,389 A | 1/1989 | Brannon et al. |
| 4,819,830 A | 4/1989 | Schultz |
| 4,848,605 A | 7/1989 | Wise |
| 4,882,784 A | 11/1989 | Tump |
| 4,901,649 A | 2/1990 | Fehrenbach et al. |
| 4,909,378 A | 3/1990 | Webb |
| 4,909,556 A | 3/1990 | Koskinen |
| 4,917,019 A | 4/1990 | Hesch et al. |
| 4,919,583 A | 4/1990 | Speakman, Jr. |
| 4,946,068 A | 8/1990 | Erickson et al. |
| 4,947,760 A | 8/1990 | Dawson et al. |
| 4,975,205 A | 12/1990 | Sloan |
| 4,995,522 A | 2/1991 | Barr |
| 5,004,400 A | 4/1991 | Handke |
| 5,042,538 A | 8/1991 | Wiese |
| 5,069,352 A | 12/1991 | Harbolt et al. |
| 5,102,286 A | 4/1992 | Fenton |
| 5,105,858 A | 4/1992 | Levinson |
| 5,131,524 A | 7/1992 | Uehara |
| 5,199,826 A | 4/1993 | Lawrence |
| 5,201,546 A * | 4/1993 | Lindsay ........................ 280/789 |
| 5,224,635 A | 7/1993 | Wise |
| 5,253,776 A | 10/1993 | Decroix et al. |
| 5,286,158 A | 2/1994 | Zimmerman |
| 5,320,046 A | 6/1994 | Hesch |
| 5,339,996 A | 8/1994 | Dubbert |
| 5,373,792 A | 12/1994 | Pileggi et al. |
| 5,402,915 A | 4/1995 | Hogan |
| 5,413,154 A | 5/1995 | Hurst, Jr. et al. |
| 5,429,259 A | 7/1995 | Robin |
| 5,441,321 A | 8/1995 | Karpisek |
| 5,445,289 A | 8/1995 | Owen |
| 5,470,175 A | 11/1995 | Jensen et al. |
| 5,538,286 A | 7/1996 | Hoff |
| 5,564,599 A | 10/1996 | Barber et al. |
| 5,602,761 A | 2/1997 | Spoerre et al. |
| 5,613,446 A | 3/1997 | DiLuigi et al. |
| RE35,580 E | 8/1997 | Heider et al. |
| 5,687,881 A | 11/1997 | Rouse et al. |
| 5,690,466 A | 11/1997 | Gaddis et al. |
| 5,706,614 A | 1/1998 | Wiley et al. |
| 5,761,854 A | 6/1998 | Johnson et al. |
| 5,762,222 A | 6/1998 | Liu |
| 5,782,524 A | 7/1998 | Heider et al. |
| 5,785,421 A | 7/1998 | Milek |
| 5,806,863 A | 9/1998 | Heger et al. |
| 5,836,480 A | 11/1998 | Epp et al. |
| 5,876,172 A | 3/1999 | Di Rosa |
| 5,911,337 A | 6/1999 | Bedeker |
| 5,927,558 A | 7/1999 | Bruce |
| 5,971,219 A | 10/1999 | Karpisek |
| 6,002,063 A | 12/1999 | Bilak et al. |
| 6,069,118 A | 5/2000 | Hinkel et al. |
| 6,077,068 A | 6/2000 | Okumura |
| 6,109,486 A | 8/2000 | Lee |
| 6,120,233 A | 9/2000 | Adam |
| 6,155,175 A | 12/2000 | Rude et al. |
| 6,190,107 B1 | 2/2001 | Lanigan et al. |
| 6,192,985 B1 | 2/2001 | Hinkel et al. |
| 6,205,938 B1 | 3/2001 | Foley et al. |
| 6,247,594 B1 | 6/2001 | Garton |
| 6,283,212 B1 | 9/2001 | Hinkel et al. |
| 6,306,800 B1 | 10/2001 | Samuel et al. |
| 6,328,156 B1 | 12/2001 | Otsman |
| 6,328,183 B1 | 12/2001 | Coleman |
| 6,364,584 B1 | 4/2002 | Taylor |
| 6,401,983 B1 | 6/2002 | McDonald et al. |
| 6,415,909 B1 | 7/2002 | Mitchell et al. |
| 6,457,291 B2 * | 10/2002 | Wick ........................... 52/653.1 |
| 6,508,615 B2 | 1/2003 | Taylor |
| 6,537,002 B2 | 3/2003 | Gloystein |
| 6,575,614 B2 | 6/2003 | Tosco et al. |

(56) References Cited

U.S. PATENT DOCUMENTS

| | | | |
|---|---|---|---|
| 6,660,693 B2 | 12/2003 | Miller et al. | |
| 6,675,073 B2 | 1/2004 | Kieman et al. | |
| 6,720,290 B2 | 4/2004 | England et al. | |
| 6,772,912 B1 | 8/2004 | Schall et al. | |
| 6,776,235 B1 | 8/2004 | England | |
| 6,783,032 B2 | 8/2004 | Fons | |
| 6,811,048 B2 | 11/2004 | Lau | |
| 6,828,280 B2 | 12/2004 | England et al. | |
| 6,835,041 B1 | 12/2004 | Albert | |
| 6,882,960 B2 | 4/2005 | Miller | |
| 6,902,061 B1 | 6/2005 | Elstone | |
| 6,915,854 B2 | 7/2005 | England et al. | |
| 6,953,119 B1 | 10/2005 | Wening | |
| 6,955,127 B2 | 10/2005 | Taylor | |
| 6,968,946 B2 | 11/2005 | Shuert | |
| 7,084,095 B2 | 8/2006 | Lee et al. | |
| 7,104,425 B2 | 9/2006 | Le Roy | |
| 7,140,516 B2 | 11/2006 | Bothor | |
| 7,214,028 B2 | 5/2007 | Boasso | |
| 7,240,681 B2 | 7/2007 | Saik | |
| 7,252,309 B2 | 8/2007 | Eng Soon et al. | |
| 7,284,579 B2 | 10/2007 | Elgan et al. | |
| 7,316,333 B2 | 1/2008 | Wegner | |
| 7,475,796 B2 | 1/2009 | Garton | |
| 7,513,280 B2 | 4/2009 | Brashears et al. | |
| 7,753,637 B2 | 7/2010 | Benedict et al. | |
| 7,802,958 B2 | 9/2010 | Garcia et al. | |
| 7,837,427 B2 | 11/2010 | Beckel | |
| 7,921,783 B2 | 4/2011 | Forbes et al. | |
| 7,967,161 B2 | 6/2011 | Townsend | |
| 8,083,083 B1 | 12/2011 | Mohns | |
| 8,186,704 B2 * | 5/2012 | Cesternino | 280/425.1 |
| 8,201,520 B2 | 6/2012 | Meritt | |
| 8,313,278 B2 | 11/2012 | Simmons et al. | |
| 8,465,040 B2 * | 6/2013 | Skalbeck et al. | 280/417.1 |
| D688,351 S | 8/2013 | Oren | |
| 8,505,780 B2 | 8/2013 | Oren | |
| 8,585,341 B1 | 11/2013 | Oren | |
| 8,616,370 B2 | 12/2013 | Allegretti | |
| 8,622,251 B2 | 1/2014 | Oren | |
| 8,668,430 B2 | 3/2014 | Oren | |
| D703,582 S | 4/2014 | Oren | |
| 8,827,118 B2 | 9/2014 | Oren | |
| 8,887,914 B2 | 11/2014 | Allegretti | |
| 2001/0022308 A1 | 9/2001 | Epp et al. | |
| 2001/0045338 A1 | 11/2001 | Ransil et al. | |
| 2002/0134550 A1 | 9/2002 | Leeson et al. | |
| 2002/0139643 A1 | 10/2002 | Peltier et al. | |
| 2003/0111470 A1 | 6/2003 | Fouillet et al. | |
| 2003/0156929 A1 | 8/2003 | Russell | |
| 2004/0065699 A1 | 4/2004 | Schoer et al. | |
| 2004/0074922 A1 | 4/2004 | Bother et al. | |
| 2004/0084874 A1 * | 5/2004 | McDougall et al. | 280/441.2 |
| 2004/0206646 A1 | 10/2004 | Goh | |
| 2004/0245284 A1 | 12/2004 | Mehus et al. | |
| 2005/0158158 A1 | 7/2005 | Porta | |
| 2005/0201851 A1 | 9/2005 | Jonkka | |
| 2006/0180062 A1 | 8/2006 | Furrer et al. | |
| 2006/0180232 A1 | 8/2006 | Glewwe et al. | |
| 2006/0239806 A1 | 10/2006 | Yelton | |
| 2006/0267377 A1 | 11/2006 | Lusk et al. | |
| 2006/0277783 A1 | 12/2006 | Garton | |
| 2007/0125543 A1 | 6/2007 | McNeel et al. | |
| 2007/0194564 A1 * | 8/2007 | Garceau et al. | 280/789 |
| 2008/0008562 A1 | 1/2008 | Beckel et al. | |
| 2008/0029546 A1 | 2/2008 | Shuld | |
| 2008/0029553 A1 | 2/2008 | Culleton | |
| 2008/0179054 A1 | 7/2008 | McGough et al. | |
| 2008/0179324 A1 | 7/2008 | McGough et al. | |
| 2008/0213073 A1 | 9/2008 | Benedict et al. | |
| 2008/0226434 A1 | 9/2008 | Smith et al. | |
| 2008/0264641 A1 | 10/2008 | Slabaugh et al. | |
| 2009/0038242 A1 | 2/2009 | Cope | |
| 2009/0078410 A1 | 3/2009 | Krenek et al. | |
| 2010/0021258 A1 | 1/2010 | Kim | |
| 2010/0038143 A1 | 2/2010 | Burnett et al. | |
| 2010/0040446 A1 | 2/2010 | Renyer | |
| 2010/0065466 A1 | 3/2010 | Perkins | |
| 2010/0108711 A1 | 5/2010 | Wietgrefe | |
| 2011/0011893 A1 | 1/2011 | Cerny | |
| 2011/0017693 A1 | 1/2011 | Thomas | |
| 2011/0101040 A1 | 5/2011 | Weissbrod | |
| 2011/0160104 A1 | 6/2011 | Wu et al. | |
| 2011/0222983 A1 | 9/2011 | Dugic et al. | |
| 2012/0219391 A1 | 8/2012 | Teichrob et al. | |
| 2013/0004272 A1 | 1/2013 | Mintz | |
| 2013/0022441 A1 | 1/2013 | Uhryn et al. | |
| 2013/0206415 A1 | 8/2013 | Sheesley | |
| 2013/0209204 A1 * | 8/2013 | Sheesley | 414/288 |
| 2013/0233545 A1 | 9/2013 | Mahoney | |
| 2013/0309052 A1 | 11/2013 | Luharuka | |
| 2013/0323005 A1 | 12/2013 | Rexius et al. | |
| 2014/0020765 A1 | 1/2014 | Oren | |
| 2014/0020892 A1 | 1/2014 | Oren | |
| 2014/0023465 A1 | 1/2014 | Oren et al. | |
| 2014/0083554 A1 | 3/2014 | Harris | |
| 2014/0097182 A1 | 4/2014 | Sheesley | |
| 2014/0166647 A1 | 6/2014 | Sheesley | |
| 2014/0203046 A1 | 7/2014 | Allegretti | |
| 2014/0234059 A1 | 8/2014 | Thomeer | |
| 2014/0321950 A1 | 10/2014 | Krenek et al. | |
| 2015/0069052 A1 | 3/2015 | Allegretti et al. | |

FOREIGN PATENT DOCUMENTS

| | | |
|---|---|---|
| CN | 201881469 | 6/2011 |
| DE | 3108121 | 9/1982 |
| DE | 3342281 | 6/1985 |
| EP | 0019967 | 12/1980 |
| EP | 0997607 | 5/2003 |
| EP | 1775190 | 4/2007 |
| EP | 2062832 | 5/2009 |
| GB | 1296736 | 11/1972 |
| GB | 2374864 | 10/2002 |
| JP | S4871029 | 9/1973 |
| JP | S4876041 | 9/1973 |
| JP | S58161888 | 10/1983 |
| JP | 10-87046 | 4/1998 |
| MX | 2012011046 | 5/2013 |
| WO | 9008082 | 7/1990 |
| WO | 9202437 | 2/1992 |
| WO | 9306031 | 4/1993 |
| WO | 2006039757 | 4/2006 |
| WO | 2007005054 | 1/2007 |
| WO | 2010026235 | 3/2010 |
| WO | 2011099358 | 8/2011 |
| WO | 2012021447 | 2/2012 |
| WO | 2012058059 | 5/2012 |

OTHER PUBLICATIONS

European Search Report for Application No. 15167039.5, Sep. 8, 2015. (7 pages).

International Search Report for PCT/US2015/024810, Jul. 8, 2015. (13 pages).

File History for U.S. Appl. No. 61/538,616, Robert A. Harris, Sep. 23, 2011. (21 pages).

International Search Report for PCT/US15/35635, Oct. 30, 2015. (12 pages).

PCT International Search Report for PCT/US15/49074, Dec. 17, 2015. (11 pages).

PCT International Search Report for PCT/US15/57601, May 6, 2016. (11 pages).

International Search Report for PCT/US2015/012990, dated May 6, 2015. (15 pages).

FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).

* cited by examiner

TRAILER ASSEMBLY FOR TRANSPORT OF CONTAINERS OF PROPPANT MATERIAL

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to container trailer assemblies. Additionally, the present invention relates to systems and apparatus for the transport of proppant material. More particularly, the present invention relates to a trailer assembly that is particularly suitable for the transport of containers of proppant material.

2. Description of Related Art Including Information Disclosed Under 37 CFR 1.97 and 37 CFR 1.98.

Hydraulic fracturing is the propagation of fractions in a rock layer caused by the presence of pressurized fluid. Hydraulic fractures may form naturally, in the case of veins or dikes, or may be man-made in order to release petroleum, natural gas, coal seam gas, or other substances for extraction. Fracturing is done from a wellbore drilled into reservoir rock formations. The energy from the injection of a highly-pressurized fracking fluid creates new channels in the rock which can increase the extraction rates and ultimate recovery of fossil fuels. The fracture width is typically maintained after the injection by introducing a proppant into the injected fluid. Proppant is a material, such as grains of sand, ceramic, or other particulates, that prevent the fractures from closing when the injection is stopped.

With the rise of hydraulic fracturing over the past decade, there is a steep climb in proppant demand. Global supplies are currently tight. The number of proppant suppliers worldwide has increased since 2000 from a handful to well over fifty sand, ceramic proppant and resin-coat producers.

By the far the dominant proppant is silica sand, made up of ancient weathered quartz, the most common mineral in the Earth's continental crust. Unlike common sand, which often feels gritty when rubbed between the fingers, sand used as a proppant tends to roll to the touch as a result of its round, spherical shape and tightly-graded particle distribution. Sand quality is a function of both deposit and processing. Grain size is critical, as any given proppant must reliably fall within certain mesh ranges, subject to downhole conditions and completion design. Generally, coarser proppant allows the higher flow capacity due to the larger pore spaces between grains. However, it may break down or crush more readily under stress due to the relatively fewer grain-to-grain contact points to bear the stress often incurred in deep oil- and gas-bearing formations.

Typically, in any hydraulic fracturing operation, a large amount of such proppant is required. The transport of proppant presents significant issues and difficulties. Fundamentally, governmental roads requirements establish a limit as to the amount of weight that can be transported over the roads. These weight limits are established so as to avoid damage to the structural integrity of the road and also damage to any bridges, overpasses, or other structures associated with the road. Additionally, there are height requirements on such transport vehicles. Conventionally, all transport vehicles should have a height of less than 13½ feet. As such, the transport vehicle can travel on virtually all roads without issues associated with low overlying bridges and overpasses. Additionally, in the transport of proppant, there are a variety of issues related to the safety of the transport. For example, structures should be provided so as to avoid any shifting of the proppant contents in the container that is being transported. Further, concern should also be directed to the center of gravity associated with the contained proppant on the vehicle. If the center of gravity is too high, then there is an increased likelihood of a potential overturning of the vehicle and a reduction in the handling capability of the vehicle.

Conventionally, a 20 foot ISO container could be utilized so as to transport proppant on a conventional container trailer. Unfortunately, experiments have determined that the transport of sand in such conventional containers is not suitable. If the 20 foot ISO is filled with proppant material, then it would certainly exceed the government weight limits on the road. If the 20 foot ISO container were filled with a lesser amount of proppant material, the material could more easily shift in the container and create a dangerous driving condition. Additionally, if a 20 foot ISO container is minimally filled with proppant, the angle of repose of the proppant in the container would make it extremely difficult to completely empty the proppant material from the container. As such, it would not be possible to empty a conventional 20 foot container. As such, a need has developed so as to avoid the use of a 20 foot container for the transport of proppant material.

Importantly, the weight limits that are imposed by government authorities on the transport of goods on road requires that the weight limit be under 80,000 pounds. This weight limit will include the truck, the trailer and the load that is being transported by the truck and trailer. As such, the weight of the vehicle is of a significant concern when determining the amount of proppant that can be moved by a trailer over the roads. As such, it is desirable to minimize the weight of the truck and trailer while still preserving the structural integrity of the truck and trailer.

In the earlier patent applications by the present inventor (for example, U.S. patent application Ser. No. 13/628,702) a 10 foot ISO container was proposed. In this earlier application, it is found that the 10 foot ISO container has a height of 8.5 feet. As such, such a container would contain less than an optimal amount of proppant. In order to deliver the desired 46,500 pounds of proppant to the site, and in order to provide a proper angle of repose of the proppant material within the container, it was found that an ISO container with a height of 9.5 feet was necessary. If such a container of an increased height were actually used on a conventional container trailer, it would exceed the height requirements for the vehicle. If the conventional container trailer were used, the total weight of the vehicle would be in excess of the 80,000 pound limit. Additionally, the placement of the container on the top of a conventional container trailer would increase the center of gravity to the trailer and, as such, increase the potential for vehicle overturns and reduce the handling capability of the truck. Additionally, a standard container trailer could cause the operator to place the sand container in an improper location along the length of the trailer such that the weight is not properly centered for proper transport.

In the past, various patents have issued relating to container trailers. For example, U.S. Pat. No. 3,958,707, issued on May 25, 1976 to D. L. Deppe, discloses a container transport trailer having a bottomless U-shaped support frame including a cross member and a pair of side members. A lift member is connected to the forward end of the trailer and cooperates with a pair of support arms pivotally connected to the rear ends of the side members of the U-shaped flame to engage against the rear portion of the article.

U.S. Pat. No. 5,839,864, issued on Nov. 24, 1998 to S. K. Reynard, teaches a locking system for a container-carrying trailer having a loading platform on which a container can be mounted. The locking system comprises a forward pair of locking devices and a rearward pair of locking devices mounted at forward and rear ends of the loading platform. The locking device is cooperative with respective corner fittings of the container in order to clamp the container to the loading platform.

U.S. Pat. No. 6,109,684, issued on Aug. 29, 2000 to M. A. Reitnouer, discloses a flatbed trailer design that unitizes the three main components of a trailer bed, i.e. the main rails, the cross members and the floor, to create a lightweight and stronger trailer. The trailer design comprises two main rails having dual webs and a plurality of shouldered cross members. These dual web main rails and shouldered cross members have top flanges that are formed by the upper plane of the flooring members. In addition, intermediate flooring supports are used between cross members.

U.S. Pat. No. 7,866,933, issued on Jan. 11, 2011 to Welch et al., teaches a container trailer that includes a coupling to attach the trailer to a tractor, and a frame attached to the coupling. The frame is positioned as a single unit about a container such that the frame can be attached to the container in four regions of the container to lift the container. The trailer has road wheels for long-haul transportation. The trailer frame can be positioned about the container by laterally expanding and retracting, pivoting about a horizontal axis, and pivoting about a vertical axis.

U.S. Pat. No. 8,182,193, issued on May 22, 2012 to Gaudet et al., shows a trailer for transporting freight a container. The trailer has a frame with a front frame section which is adapted to be coupled to a suitable road vehicle. A pair of displaceable horizontal side beams are secured to the front frame section and are provided with a hingeable rear gate formed by a pair of hinge arms. Each of the side beams has a suspension assembly to support a tandem wheel arrangement. Retractable vertical lifting piston cylinders are secured to a portion of the front frame and to the pair of hinge arms and are actuable to lift the pair of horizontal side beams and its wheels above a ground surface. Laterally extendable piston cylinders are also secured to the front frame and the hinge arms to displace the horizontal side beams outwardly and inwardly with respect to one another when lifted off the ground surface. Container lifting posts are secured to opposed ends of the front frame section and the hinge arms for removable connection to a container positioned between the side beams to lift and lower the container therebetween. Container connectors are secured to each of the side beams for securing a container thereto for transportation.

U.S. Patent Publication No. 2013/0004272, published on Jan. 3, 2013 to M. Mintz, provides an apparatus for transporting proppant for use in standard ISO intermodal container and for delivering the proppant to well sites. The apparatus is configured for being inserted into a standard 20 foot container and adapted for transporting frac sand and proppant from a quarry to a well site. A plurality of inlet ports are disposed atop the roof, with the inlet ports receiving the proppant from a proppant supply source into a funnel/hopper. A plurality of outlet ports received the proppant within the funnel/hopper and deliver the proppant to the well site. An in situ valve is disposed within the hopper assembly for effectuating industry standard continuous pressurized discharge of stored proppant material into a discharge pipe for delivery downhole.

It is an object of the present invention to provide a trailer assembly that is able to effectively transport a 10 foot ISO container.

It is another object of the present invention to provide a trailer assembly that facilitates the transport of proppant in containers positioned thereon.

It is another object of the present invention to provide a trailer assembly which is of minimal of weight so as to facilitate the delivery of a maximum amount of proppant within the container positioned thereon.

It is still another object of the present invention to provide a trailer assembly which minimizes the center of gravity of the proppant-containing container positioned thereon.

It is still another object of the present invention to provide a trailer assembly which allows multiple empty proppant containers to be positioned thereon.

It is still a further object of the present invention to provide a trailer assembly which allows the proppant-containing container to meet height and weight requirements during the transport of proppant.

It is still another object of the present invention to provide a trailer assembly which is easy to use, relatively inexpensive and easy to manufacture.

These and other objects and advantages of the present invention will become apparent from a reading of the attached specification and appended claims.

BRIEF SUMMARY OF THE INVENTION

The present invention is a trailer assembly which comprises a frame having a first section and a second section, and a plurality of wheels rotatably mounted below the first section so as to allow the frame to move along an underlying surface. The first section is positioned at a higher level than the second section. Each of the first and second sections has length of at least 10 feet. The first section is suitable for receiving a first sand container thereon. The second section is also suitable for receiving a second sand container thereon. The frame has a connector section suitable for connection to a towing vehicle.

The first section has a planar top surface. The second section has a planar top surface. The first section has a top surface extending in a plane approximate 1 foot 9 inches above a plane in which a top surface of the second section extends.

The frame has a first side rail and a second side rail extending in spaced parallel relation to each other. The frame also has a plurality of cross members extending between the first side rail and the second side rail. The first section has a first outrigger extending across the first and second side rails so as to have a first end extending outwardly of the first side rail and a second end extending outwardly of the second side rail. The first section has a second outrigger extending across the first and second side rails so as to have a first end extending outwardly of the first side rail and a second end extending outwardly of the second side rail. The first and second outriggers are suitable for attachment to an underside of the first container.

The second section has a first outrigger extending across the first and second side rails so as to have a first end extending outwardly of the first side rail and a second end extending outwardly of the second side rail. The second section also has a second outrigger extending across the first and second side rails so as to have a first end extending outwardly of the first side rail and a second end extending outwardly of the second side rail. The first and second outriggers of the second section are suitable for attachment to the underside of the second container. The first outrigger is positioned in transverse relationship to the first and second side rails. The second outrigger is positioned in transverse relation to the first and second side rails. The first outrigger of the first section is positioned at an end of the frame. The second outrigger of the first section is positioned adjacent the second section.

The plurality of wheels are positioned below and between the first and second outriggers of the first section. The connector section is a gooseneck connector having a portion extending upwardly from an end of the second section opposite the first section. The connector section has another portion extending away from the second section.

In the present invention, the first container would be an empty container. The empty container would be positioned directly above the wheels. In the present invention, the second container would be a container that is filled with proppant material. When the second container is filled with proppant material, it is placed on the second section of the trailer. Under these circumstances, there would be no first container placed on the first section. When the second container is empty, a pair of containers, i.e. the first container and the second container, can be respectfully placed on the first section and the second section. As such, when the trailer is used to transport proppant to a well site, the second container (filled with proppant) is placed on the second section of the trailer and the truck can serve to tow the trailer to the well site. At the well site, an empty container can be placed on the second section and another empty container can be placed on the first section. As such, a pair of empty containers can be transported from the well site.

The foregoing Section is intended to describe, in generality, the preferred embodiment of the present invention. It is understood that modifications to this preferred embodiment can be made within the scope of the present invention. As such, this Section should not be construed, in any way, as limiting of the broad scope of the present invention. The present invention should only be limited by the following claims and their legal equivalents.

DETAILED DESCRIPTION OF THE INVENTION

Figure 1:
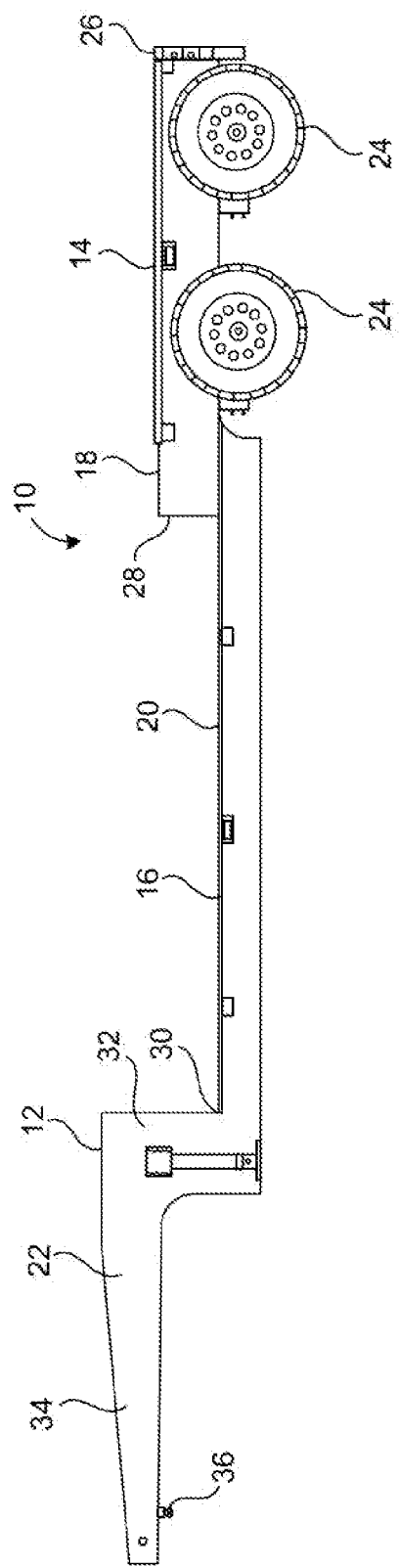
FIG. 1 is a side elevational view of a trailer assembly in accordance with the preferred embodiment of the present invention.

Referring to FIG. 1, there is shown the trailer assembly 10 in accordance with the preferred embodiment of the present invention. The trailer assembly 10 includes a frame 12 that has a first section 14 and a second section 16. The first section 14 is located at a higher level than the level of the second section 16. The first section 14 has a planar top surface 18. The second section 16 has a planar top surface 20. The planar top surface 18 of the first section 14 is in spaced parallel planar relationship to the planar top surface 20 of the second section 16. Each of the sections 14 and 16 will have a length of at least ten feet. The first section 14 is suitable for receiving a sand container thereon. The second section 16 is also suitable for receiving a sand container thereon. The frame 12 has a connector section 22 at the forward end thereof suitable for connection to a towing vehicle. A plurality of wheels 24 are rotatably mounted below the first section 14 so as to allow the frame 12 to move along an underlying surface.

The first section 14 is located directly above the wheels 24. A first section 14 has its planar surface 18 located about one foot nine inches above the planar top surface 20 of the second section 16. The first section 14 has an end 26 adjacent a rear of the trailer 12. The opposite end 28 is located adjacent to the second section 16.

The second section 16 has the planar top surface 20 extending from the end 28 of the first section 14 to an end 30 adjacent the connector section 22. The second section 16 is suitably welded, bolted, or otherwise connected to the underside of the first section 14 adjacent to the wheels 24. As such, this underslung configuration will minimize the height of the second section 16 so as to allow the heavy weights of a loaded proppant container to be placed thereon in an easy and convenient manner and also to minimize the center of gravity of the trailer 10 while traveling along a road surface.

The connector section 22 is a gooseneck connector having an end adjacent to the end 30 of the second section 16, a portion 32 extending upwardly therefrom, and a generally horizontal portion 34 extending to a coupling 36. Coupling 36 allows the trailer 10 to be suitably joined to a towing vehicle.

Figure 2:
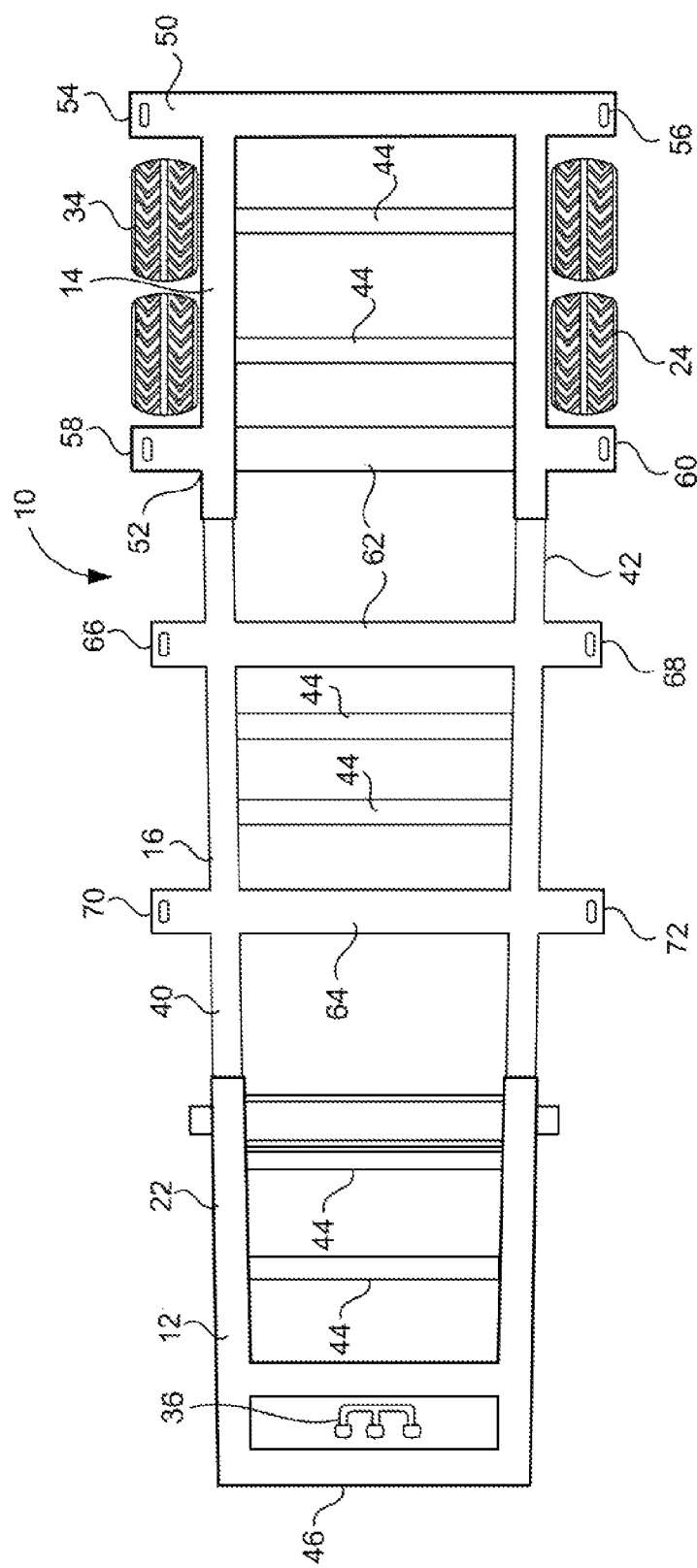
FIG. 2 is a plan view of a the trailer assembly of the preferred embodiment of the present invention.

FIG. 2 illustrates the frame 10 in a plane view. The frame 10 has a first side rail 40 and a second side rail 42 extending in parallel planar relationship to each other. A plurality of cross members 44 extend between the first side rail 40 and the second side rail 42. As such, cross members 44 enhance the structural integrity of the frame 12. These cross members 44, in combination with the side rails 40 and 42 also serve to minimize the weight of the trailer 10.

In FIG. 2, the first section 14 is illustrated as positioned above the wheels 24. In the present invention, the wheels 24 are arranged in tandem. Each of the tires associated with the wheels 24 can be of an expanded form so that the weight of each of the wheels 24 is minimized. In other words, the tires associated with each of the wheels 24 will have a width that is substantially greater than conventional trailer tires. It can be seen that a container placed upon the side rails 40 and 42 in the area of first section 14 will be located above the wheels 24 and between the wheels 24. As such, the wheels 24 will provide substantial support, in combination with the frame 12, for the transport of an empty container on the first section 14.

The second section 16 extends from the first section 14 to the connector section 22. Cross members 44 also extend between the side rails 40 and 42 in the second section 16. The use of the cross members 44, in combination with the side rails 40 and 42, further serve to minimize the weight of the trailer 10 for the transport of substantial quantities of proppant material. As such, the cross members 44, in combination with the side rails 40 and 42, maintain the structural integrity of the trailer 10 while, at the same time, reducing the weight of the trailer such that the loaded container can be transported within the weight limits imposed by governments on roads.

The connector section 22 also has cross members 44 extending between the side rails 40 and 42. The coupling 36 is illustrated adjacent to the forward end 46 of the frame 12.

Importantly, in FIG. 2, the first section 14 has a first outrigger 50 and a second outrigger 52. The first outrigger 50 extends across the first side rail 40 and the second side rail 42 so as to have one end 54 extending outwardly of the first side rail 40 and an opposite end 56 extending outwardly of the second side rail 42. Similarly, the second outrigger 52 extends across the side rails 40 and 42 so as to have an end 58 extending outwardly of the first side rail 40 and an end 60 extending outwardly of the second side rail 42. As such, the outriggers 50 and 52 are suitably configured so as to receive a ten foot ISO container thereon. Suitable connector mechanisms are provided on the outwardly extending portions of the outriggers 50 and 52 so as to secure, in a conventional fashion, with the connectors at the bottom of the container.

The second section 16 includes a first outrigger 62 and a second outrigger 64. The first outrigger 62 has an end 66 which extends outwardly of the first side rail 40 and an another end 68 extending outwardly of the second side rail 42. The second outrigger 64 of the second section 16 has an end 70 which extends outwardly of the first side rail 40 and an end 72 which extends outwardly of the second side rail 42. As such, the outriggers 60 and 62 are suitably positioned so as to receive the second container thereon. The location of the loaded container placed upon the outriggers 62 and 64 will centralize the loaded container on the trailer 10 so as to enhance the transport capability of such a container. Suitable locking mechanisms can be provided on the outriggers 62 and 64 so as to secure the underside of the second container.

Figure 3:
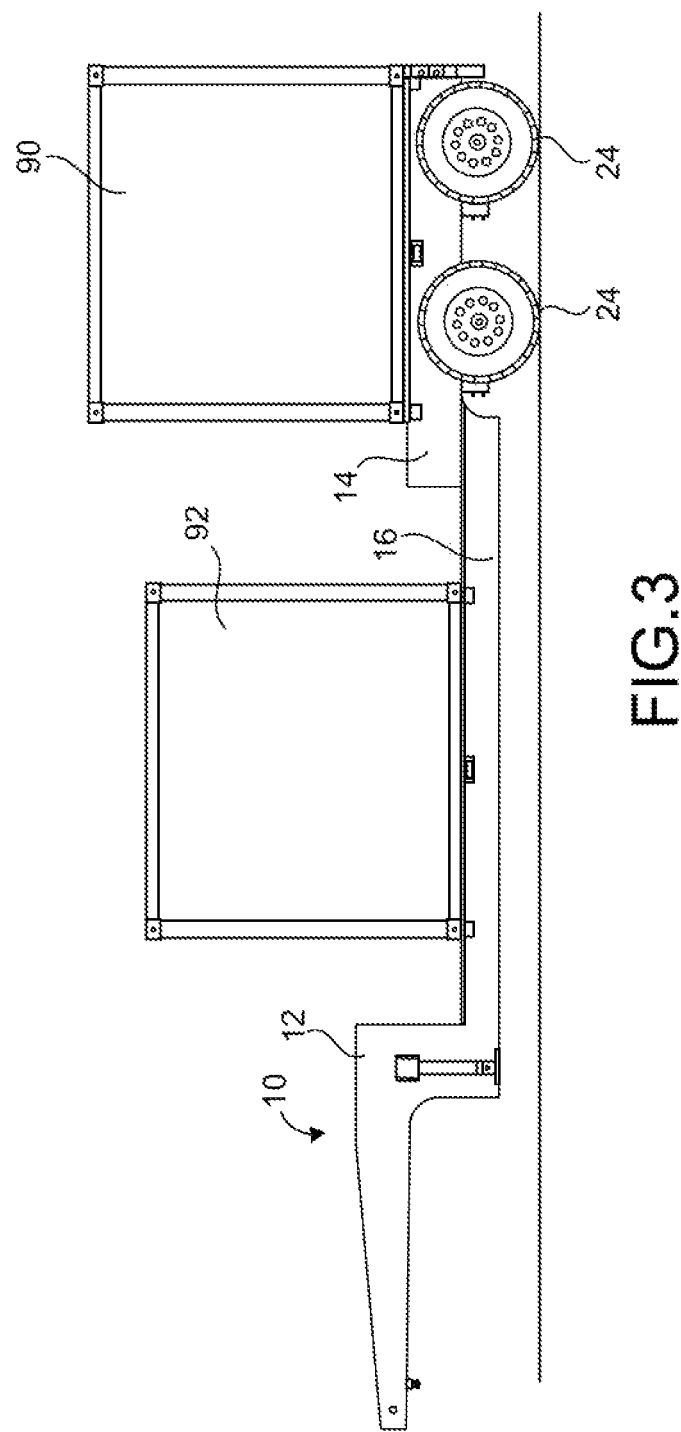
FIG. 3 is a side elevational view of the trailer assembly of the present invention as used in the transport of proppant containers.

FIG. 3 illustrates the manner in which a first container 90 is secured to the first section 14 of the frame 12 of the trailer 10 and the manner in which the second container 92 is secured to the second section 16 of the frame 12 of the trailer 10. In normal use, the first container 90 would be an empty container. This empty container is positioned on the first section 14 directly above the wheels 24 such that the empty container 90 can be transported from the well site. As illustrated in FIG. 3, the second container 92 is also an empty container. The empty container 92 is placed upon the outriggers 62 and 64 of the second section 16 so as to be transported from the well site. In this manner, the trailer 10 is suitable for transporting a plurality of empty containers from the well site.

Dimensional indications are provided on FIG. 3. As can be seen, the first container 90 will extend upwardly so as to have a height of thirteen feet three inches above the road surface. The container 90 has a height of nine feet six inches. As such, the total height of the first container 90 above the road will be three inches less than the height requirement of 13.5 feet. Since the second container 92 is positioned at a lower level than that of the first container 90, the height of the second container 92 will have no effect during its transport along the road surface. Each of the containers 90 and 92 are suitably positioned on the trailer 10 in an optimal manner so as to enhance the handling capability of the truck during the transport of the containers 90 and 92 from the well site.

Importantly, in the present invention, when it is desired to transport proppant to the well site, only a single container can be used. The single container can be filled with 46,500 pounds of proppant. This 9.5 foot tall container will provide a proper angle of repose of the proppant within the container such that the proppant can be properly discharged from the container through an outlet at the bottom of the container.

In view of the great weight of the filled container, a single container can be used on the trailer 10 during transport to the well site. This single container would be in the nature of container 92. Container 92 is properly filled with proppant and placed upon the second section 16 of the frame 12. It can be seen that the weight of the proppant in the container 92 is properly centralized on the trailer 12 by being positioned on the lower second section 16. Additionally, the use of the lower second section 16 will create a lower center-of-gravity of the load on the trailer 10. As such, the handling characteristics of the trailer 10 are greatly improved and the possibilities of an overturn are avoided. The load in the container 92 is properly supported by the truck and by the wheels 24 so as to distribute the load of the container over a relatively wide and long area. As such, shifting of the load is effectively avoided. The unique structure of the trailer 10 creates a minimal weight trailer for this intended purpose so that the load can be safely and easily transported within the weight limits imposed upon roads.

In the configuration shown in FIG. 3, when a loaded container is transported, the first container 90 should not be placed on the first section 14. The placement of the container 90 on the first section 14 during the transport of the loaded container 92 could exceed the weight limits of the road.

Once the loaded container 92 reaches the well site, the container 92 can be released from the locking mechanisms associated with the outriggers 62 and 64 and the load can be lifted and delivered for proper discharge. Subsequently, empty containers, such as containers 90 and 92, can be put on the trailer 10 for transport back to the proppant supplying location.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A trailer for transporting fracking proppant, the trailer comprising:
    a frame having a skeletal structure with a first section and a second section, the first section being positioned at a higher elevation from an underlying support surface than the elevation of the second section with respect to the underlying support surface, the frame positioned to support: (a) a substantially full second fracking proppant container on the second section of the frame when being transported to a well site, and (b) a substantially empty first fracking proppant container and the substantially empty second fracking proppant container, including the substantially empty first fracking proppant container positioned on the first section of the frame and the substantially empty second fracking proppant container positioned on the second section of the frame, when being transported away from the well site, the frame further having:
  a first side rail and a second side rail extending in spaced-apart and substantially parallel relationship to each other to receive and support a fracking proppant container when loaded onto the trailer, the fracking proppant container positioned on respective top surfaces of the respective side rails;
  a plurality of cross members extending between the first side rail and the second side rail to enhance the strength of the frame, the plurality of cross members being selectively positioned proximate locations that receive the first and second fracking proppant containers when the first and second fracking proppant containers are positioned on the trailer;
  the first section having a first outrigger member extending across the first and second side rails so as to have a first end extending outwardly of the first side rail and a second end extending outwardly of the second side rail, a first surface of the first outrigger being substantially flush with the top surface thereof, the first outrigger member having a first connector mechanism for connecting the first outrigger member to the first fracking proppant container, and one or more cross member of the plurality of cross members positioned proximate the first outrigger member, and receiving and supporting the first fracking proppant container when positioned thereon;
  the second section having a second outrigger member extending across the first and second side rails so as to have a first end extending outwardly of the first side rail and a second end extending outwardly of the second side rail, a second surface of the second outrigger being substantially flush with the top surface thereof, the second outrigger member having a second connector mechanism for connecting the second outrigger member to the second fracking proppant container, and one or more cross member of the plurality of cross members positioned proximate the second outrigger member, and receiving and supporting the second fracking proppant container when positioned thereon;
  a connector section associated with the frame and adapted to connect to a towing vehicle, the connector section being positioned forward of the first section and the second section; and
  a plurality of wheels rotatably mounted to said frame in a position at an elevation lower than said first section and adapted to contact the underlying support surface so as to allow said frame to move along the underlying support surface during movement of the plurality of wheels.

2. The trailer of claim 1, wherein the plurality of wheels have tires of greater width than conventional trailer tires to minimize weight while increasing stability of the trailer, the first section at least partially overlaps the second section, and the skeletal frame structure has open spaces between the one or more cross members that extend through the skeletal frame structure.

3. The trailer of claim 1, wherein the connector section is integral to the second section, each of the first and second sections have a length of at least about ten feet, the first section receives a first fracking proppant container thereon having a length of about ten feet, the second section receives the second fracking proppant container thereon having a length of about ten feet, and one or more open spaces underlie the first or second fracking proppant containers when positioned on the trailer.

4. The trailer of claim 1, wherein the first section has a pair of first outrigger members, and wherein the plurality of wheels are mounted to the frame in a position between the pair of first outrigger members of the first section and one or more cross member of the plurality of cross members is positioned between the pair of first outrigger members, the one or more cross member being selectively positioned to provide structural support to the trailer when the substantially empty first fracking proppant container is positioned thereon.

5. The trailer of claim 1, wherein the elevation of the first section is less than about four feet above the underlying support surface so that when a fracking proppant container having a height of about 9.5 feet is placed on the first section, the overall height of the fracking proppant container above the support surface does not exceed 13.5 feet, and the respective first end and the respective second end of the respective outrigger members are positioned at the widest parts of the trailer.

6. The trailer of claim 1, wherein the empty first fracking proppant container overlies the plurality of wheels and the skeletal frame structure is formed to reduce the weight of the trailer while still supporting the first and second fracking proppant containers when positioned thereon.

7. A trailer for transporting fracking proppant containers, the trailer comprising:
  a connector section for connection to a towing vehicle;
  one or more container sections that is integral to the connector section, the one or more container sections having a pair of side rails extending in spaced-apart and substantially parallel relationship relative to one another and connected by a plurality of cross-members to thereby form a skeletal frame structure to provide support to the trailer, the one or more container sections capable of supporting a substantially full proppant container for transport of proppant to a well site;
  the pair of side rails spaced so that when a fracking proppant container is loaded onto the one or more container sections, the pair of side rails underlie and support the fracking proppant container;
  a plurality of outrigger members attached to the one or more container sections, the outrigger members having a length sufficient to span the distance between the pair of side rails and extend outwardly therefrom in a direction substantially perpendicular to the long axis of the pair of side rails, the outrigger members having connector mechanisms adjacent ends thereof for securing the fracking proppant container to the trailer and one or more cross members of the plurality of cross members is arranged between the plurality of outrigger members, the one or more cross member being positioned to selectively support the trailer when the fracking proppant container is positioned thereon; and
  a plurality of wheels attached to the trailer, the wheels adapted to contact the underlying support surface so as to allow the frame to move along the underlying support surface during movement of the wheels.

8. The trailer of claim 7, wherein the plurality of wheels have tires of greater width than conventional trailer tires to minimize weight while increasing stability of the trailer, and a first container section of the one or more container sections is positioned at an elevation of not more than four feet above an underlying surface and above a second section of the one or more container sections, the first container section having a pair of side rails extending in spaced-apart and substantially parallel relationship relative to one another and connected by a plurality of first cross-members, the first container section capable of supporting a substantially empty proppant container for transport away from a well site.

9. The trailer of claim 7, wherein the length of the one or more container sections is at least about 10 feet, so that the one or more container sections can support a fracking proppant container having a 10 foot length, and the cross members are arranged so that open spaces are arranged between adjacent cross members to minimize a weight of the trainer to enable larger loads of fracking proppant to be positioned in the fracking proppant container.

10. The trailer of claim 8, wherein the first fracking proppant container is empty and is secured to the first container section, and wherein the first fracking proppant container overlies the plurality of wheels, the first container section at least partially overlaps the second container section, and one or more open spaces underlie the first fracking proppant container when positioned on the trailer.

11. A trailer for transporting fracking proppant containers, the trailer comprising:
a skeletal frame structure with a front end and a rear end, the front end including a connector for attachment of the trailer to a towing vehicle, and the rear end having wheels attached thereto to allow the trailer to roll relative to a support surface, the frame comprising:
a first raised portion having a platform of latticed support members that form a support platform having selectively positioned cross members to provide structural support to the frame; and
a second lower portion having a platform of latticed support members that form a support platform having selectively positioned cross members to provide structural support to the frame for an empty or a full fracking proppant container, the second lower portion having an elevation above the support surface less than that of the first raised portion, the second lower portion having a plurality of outrigger members that span the width of the second lower portion and extend outwardly therefrom substantially flush with the support platform, the cross members being arranged between the plurality of outrigger members, and the outrigger members having connector mechanisms for use in securing the fracking proppant container to the second lower portion.

12. The trailer of claim 11, wherein the wheels have tires of greater width than conventional trailer tires to minimize weight while increasing stability of the trailer, and the first raised portion at least partially overlaps the second lower portion.

13. The trailer of claim 11, wherein the connector portion is integral to the second portion, and the first raised portion has an elevation of less than four feet above the support surface, so that when an empty fracking proppant container having a height of about 9.5 feet is placed on the first raised portion, the overall height of the fracking proppant container above the support surface does not exceed 13.5 feet, and one or more open spaces extend through the skeletal frame structure proximate the cross members.

14. The trailer of claim 11, wherein the length of each of the first and second portions is at least about 10 feet, so that each of the first and second portions can support a fracking proppant container having a 10 foot length, and the first raised portion comprises a plurality of substantially parallel outrigger members that span the width of the first raised portion and extend outwardly therefrom substantially flush with the support platform, the outrigger members having connector mechanisms for use in securing the fracking proppant container to the first raised portion.

15. The trailer of claim 11, wherein the empty fracking proppant container overlies the plurality of wheels, and respective ends of the respective plurality of outrigger members extend outwardly from the second lower portion such that the respective ends form the widest portion of the trailer, and the cross members are selectively arranged to reduce a weight of the trailer to enable larger quantities of fracking proppant to be positioned within the fracking proppant container positioned on the trailer.

16. The trailer of claim 11, wherein the plurality of wheels are mounted to the frame in a position between the outrigger members of the first portion, the center of gravity of the trailer is sufficiently low to avoid a danger of the trailer overturning during movement, and one or more open spaces underlie the fracking proppant containers when positioned on the trailer.

* * * * *